(12) United States Patent
Wang et al.

(10) Patent No.: US 8,811,387 B2
(45) Date of Patent: Aug. 19, 2014

(54) DYNAMICALLY RECONFIGURABLE HYBRID CIRCUIT-SWITCHED AND PACKET-SWITCHED NETWORK ARCHITECTURE

(75) Inventors: Xiaolin Wang, Concord, MA (US); Qian Wu, Redwod City, CA (US); Jie Sun, Sudbury, MA (US)

(73) Assignee: Axis Semiconductor, Inc., Boxborough, MA (US)

( * ) Notice: Subject to any disclaimer, the term of this patent is extended or adjusted under 35 U.S.C. 154(b) by 182 days.

(21) Appl. No.: 13/588,012

(22) Filed: Aug. 17, 2012

(65) Prior Publication Data

US 2013/0044634 A1     Feb. 21, 2013

Related U.S. Application Data

(60) Provisional application No. 61/525,348, filed on Aug. 19, 2011.

(51) Int. Cl.
*H04L 12/66* (2006.01)
*H04Q 11/00* (2006.01)
*H04L 12/28* (2006.01)

(52) U.S. Cl.
USPC ............ 370/353; 370/354; 370/388; 370/400

(58) Field of Classification Search
CPC ........... H04L 1/22; H04L 12/50; H04L 12/64; H04L 12/5696; H04L 12/6418; H04L 45/00; H04L 45/02; H04L 45/04; H04L 2012/645641; H04L 2012/5679; H04L 2213/1304; H04L 2213/13003; H04L 49/10; H04L 49/15; H04L 49/25; H04L 49/30; H04L 49/45; H04L 49/106; H04L 49/153; H04L 49/201; H04L 49/203; H04L 49/253; H04L 49/254; H04L 49/256; H04L 49/506; H04L 49/557; H04L 49/606; H04L 49/1515; H04L 49/1523; H04L 49/1553; H04L 65/00; H04L 65/102; H04Q 3/68; H04Q 11/0407; H04Q 11/0408; H04Q 2213/1302; H04Q 2213/1304; H04Q 2213/13167
USPC ................. 370/229–239, 351–356, 386–388, 370/400–401; 709/201–202, 220–221, 709/238–245
See application file for complete search history.

(56) References Cited

U.S. PATENT DOCUMENTS 4,592,048 A * 5/1986 Beckner et al. ................ 370/354
4,656,622 A * 4/1987 Lea ............................... 370/353

(Continued)

OTHER PUBLICATIONS

PCT Search Report & Written Opinion for PCT Appl. No. PCT/US2012/051253, dated Feb. 15, 2013, 11 pages.

*Primary Examiner* — Tri H Phan
(74) *Attorney, Agent, or Firm* — Maine Cernota & Rardin

(57) ABSTRACT

A dynamically reconfigurable network architecture includes a plurality of switching modules arranged in an ordered, multi-level, switched-tree configuration. A network is formed by selecting one switching module as the root and assigning it and all directly or indirectly subsidiary modules to the network. The operating mode of each switching module can be dynamically selected as either circuit-switched or packet-switched. The modules can be grouped into a single network or into a plurality of separate networks operating in parallel, including both circuit-switched and packet-switched networks. When a network is no longer needed, its operation can be halted and its resources released for reassignment to other networks. In embodiments, a selector controlled by allocation registers selects either a circuit-switching sequencer or a packet connection arbitration circuit to control the switching circuits. Switching modules can include crossbar switches. Circuit-switched connections can use TDM to share allocated physical resources.

13 Claims, 18 Drawing Sheets

(56) References Cited

U.S. PATENT DOCUMENTS

| | | | | |
|---|---|---|---|---|
| 4,696,000 A | * | 9/1987 | Payne, III | 370/353 |
| 5,852,718 A | * | 12/1998 | Van Loo | 709/208 |
| 7,263,096 B2 | * | 8/2007 | Yang et al. | 370/353 |
| 7,912,019 B1 | * | 3/2011 | Lu et al. | 370/338 |
| 8,218,537 B1 | * | 7/2012 | Gui et al. | 370/369 |
| 8,284,766 B2 | * | 10/2012 | Anders et al. | 370/354 |
| 8,396,053 B2 | * | 3/2013 | Giles et al. | 370/352 |
| 8,687,629 B1 | * | 4/2014 | Kompella et al. | 370/388 |
| 2004/0062238 A1 | | 4/2004 | Yoshizawa et al. | |
| 2004/0120337 A1 | | 6/2004 | Jun et al. | |
| 2007/0019638 A1 | | 1/2007 | Post | |
| 2007/0076701 A1 | | 4/2007 | Yamada | |
| 2008/0069089 A1 | * | 3/2008 | Raisch et al. | 370/355 |

\* cited by examiner

| | Connection Type | Source Node | Destination Node | Connection Cycle | L0 Switching | L1 Switching | L2 Switching | L1 Switching | L0 Switching |
|---|---|---|---|---|---|---|---|---|---|
| 1 | Unicast | L1-0, L0-2 FM-3 | L1-1, L0-3 FM-4 | c1 | c1+1 FM-3 to L1-0 1 outport to L1 | c1+2 L1-0 to L2 1 outport to L2 | c1+3 L2 to L1-1 | c1+4 L1-1 to L0-3 1 inport from L2 | c1+5 L0-3 to FM-4 1 inport from L1 |
| | | | L1-0, L0-4 FM-7 | c2 | c2+1 FM-3 to L1-0 1 outport to L1 | c2+2 L1-0 to L2 1 outport to L2 | c2+3 L2 to L1-1 | c2+4 L1-1 to L0-3 1 inport from L2 | c2+5 L0-3 to FM-4 1 inport from L1 |
| 2 | Multicast | L1-2, L0-3 FM-4 | L1-0, L0-2 FM-7 | c3 | c3+1 FM-4 to L1-2 1 outport to L1 | c3+2 L1-2 to L2 1 outport to L2 | c3+3 L2 to L1-0 | c3+4 L1-0 to L0-4, L0-2 1 inport from L2 | c3+5 L0-4 to FM-7 1 inport from L1 |
| | | | | | | | | | c3+5 L0-2 to FM-7 1 inport from L1 |
| | | | L1-2, L0-5 FM-8 | | | c3+2 L1-2 to L0-5 | N/A | N/A | c3+3 L0-5 to FM-8 1 inport from L1 |

Figure 9

DYNAMICALLY RECONFIGURABLE HYBRID CIRCUIT-SWITCHED AND PACKET-SWITCHED NETWORK ARCHITECTURE

RELATED APPLICATIONS

This application claims the benefit of U.S. Provisional Application No. 61/525,348, filed Aug. 19, 2011, which is herein incorporated by reference in its entirety for all purposes.

FIELD OF THE INVENTION

The invention relates to network architectures, and more particularly, to reconfigurable network architectures.

BACKGROUND OF THE INVENTION

Networks are widely used for rapid and flexible intercommunication between devices of many types. Some networks, such as a "local area network" (LAN) or even the internet, provide data communication between computers and computer peripherals, including laptop computers, desktop computers, PDA's, smart phones, printers, scanners, and such like. Other networks provide voice and/or video communication, such as an office telephone system or even the "publically switched telephone network" (PSTN). Some networks provide macroscopic interconnection between physically separated devices, while other networks are entirely contained within a single device or chip, and are used to interconnect resources such as CPU "cores" and "digital signal processors" within the chip.

Network architectures vary widely in their designs, depending on the requirements of each specific type of network. In some networks, such as in a typical home or office LAN, the interconnected devices or "nodes" transmit data only sporadically, in relatively small quantities, and delivery of the data is not time critical. In other networks, such as in most telephone systems, nodes pair with each other and transmit large amounts of time-critical data in streams.

Networks which transmit mainly time-uncritical data typically use a "packet-switched" architecture, in which the individual data "packets" include routing information or "headers" which indicate their intended destinations. As each packet flows through the routing and switching devices of the network (herein referred to generically as "switches"), the headers are read and decoded by each switch, and the packets are routed accordingly. In this way, all packets and all nodes have equal access to the network at all times, providing maximum flexibility.

Networks which transmit mainly streams of time-critical data, such as voice or video, between pairs of nodes often use a "circuit-switched" architecture, whereby the switches of the network are controlled and configured by a separate network switch controller that configures dedicated routing paths or "circuits" between pairs of nodes over which the time-critical data can be passed in predictable and reliable streams. Once a circuit is established by the controller between a pair of nodes, the individual packets stream through the switches without any need for the switches to read and interpret individual packet headers. In this way, the data is transmitted with optimal speed, reliability, and predictability.

If a packet-switched network attempts to transmit time-critical streams of data (as in e.g. "voice-over-IP" or VoIP applications), unwanted delays (sometimes called "latency") and loss of data ("drop-outs") can occur due to packet collisions and due to the high overhead caused by requiring the switches to read each packet header and react accordingly. Of course, applications such as VoIP can be made to work by various software and hardware adaptations, and by sheer network speed and capacity. Nevertheless, a packet-switched network is not ideal for transmitting time-critical streams of data between associated pairs of nodes.

If a circuit-switched network attempts to transmit time-uncritical data between a plurality of un-paired nodes, the result is often an excessive burden placed on the network controller(s) to rapidly and frequently reconfigure the switches as needed. Since the number of switch controllers in a circuit-switched network is typically much less than the number of switches, this can lead to a significant bottleneck and possible delays and dropped packets as the limited number of controllers attempts to keep up with the demand for switch reconfiguration. In addition, circuit-switched networks are typically not ideal for multi-cast network communications, in which a single transmitting node sends packets simultaneously to a plurality of receiving nodes.

As network-dependent systems and devices have evolved and have grown in size and complexity, it has become more and more critical to use network resources as efficiently as possible. For large networks, such as a company-wide LAN, hardware and maintenance costs are increasingly significant factors, and yet such networks are often required to support both data and voice communication.

For individual, highly integrated computing devices, such as PDA's, smart phones, and other so-called "hand-held" computing devices, there has been an even greater convergence of functionality, whereby a single device is required to perform many diverse tasks in parallel, and to function at some times mainly as a telephone, at other times mainly as a data device, and at still other times as both a voice and a data device simultaneously.

Due to size, cost, and heat considerations, it is typically impractical to include redundant packet-switched and circuit-switched networks in a single LAN or on a single hand-held device so as to optimally meet frequently changing operational requirements. Instead, compromises in performance typically must be accepted so that a single internal network can be used to support an ever wider range of applications.

What is needed, therefore, is a network architecture that can provide optimized and efficient support for both time-critical streams of data between paired nodes and time uncritical communication between a plurality of unpaired nodes, whereby the network architecture can be flexibly and dynamically reconfigured as the requirements for different types of communication over the same network vary during usage.

SUMMARY OF THE INVENTION

A highly flexible network architecture provides networking resources which can be dynamically grouped into one or more networks operating in parallel, and which can be re-grouped and individually switched between circuit-switched and packet-switched modes as needed according to changing operational requirements. The network architecture of the present invention includes a plurality of switching modules arranged in a plurality of ordered levels in a switched-tree configuration so as to provide network communication between a plurality of functional and/or peripheral modules. Each of the switching modules is reconfigurable so as to function either as a circuit-switched module or a packet-switched module.

The switched-tree architecture allows the switching modules to be grouped into a single network, or into a plurality of separate networks which operate simultaneously in parallel, and which are separately configurable as circuit-switched or packet-switched networks. The configurations of the switching modules and the grouping of the elements into networks can be flexibly changed on the fly according to changing operational requirements.

Each switching module includes switching circuits which perform the actual switching of connections in both the circuit-switched and packet-switched operating modes. In embodiments, at least some of the switching circuits include crossbar switches. In embodiments, the switching circuits are controlled by either a circuit-switching sequencer or a packet connection arbitration circuit, according to a selection made between the two by a selection circuit controlled by resource allocation registers or by some other local memory element. The selection circuit thereby determines whether the switching module will function as a circuit-switched module or a packet-switched module, according to whether it is assigned to a circuit-switched network or to a packet-switched network, respectively.

Creation of a new network includes selecting one of the switching modules as the root module for the network. All of the directly and indirectly subsidiary switching modules are then automatically included in the new network, which provides connectivity to all subsidiary functional and peripheral modules. In some embodiments, some or all of the circuit switched connections in the system share allocated physical connectivity resources in a time division multiplexed (TDM) fashion.

When a network is no longer needed, its resources can be released for reassignment to other networks. In embodiments, this requires an exchange of stop command signals and ready signals among most or all of the modules in the network. Once all modules have ceased their activity in the current network, they can be released, and reassigned to one or more new networks.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 9 is a table illustrating how a circuit-switching requirement can be determined for an embodiment of the present invention;

DETAILED DESCRIPTION

Figure 1:
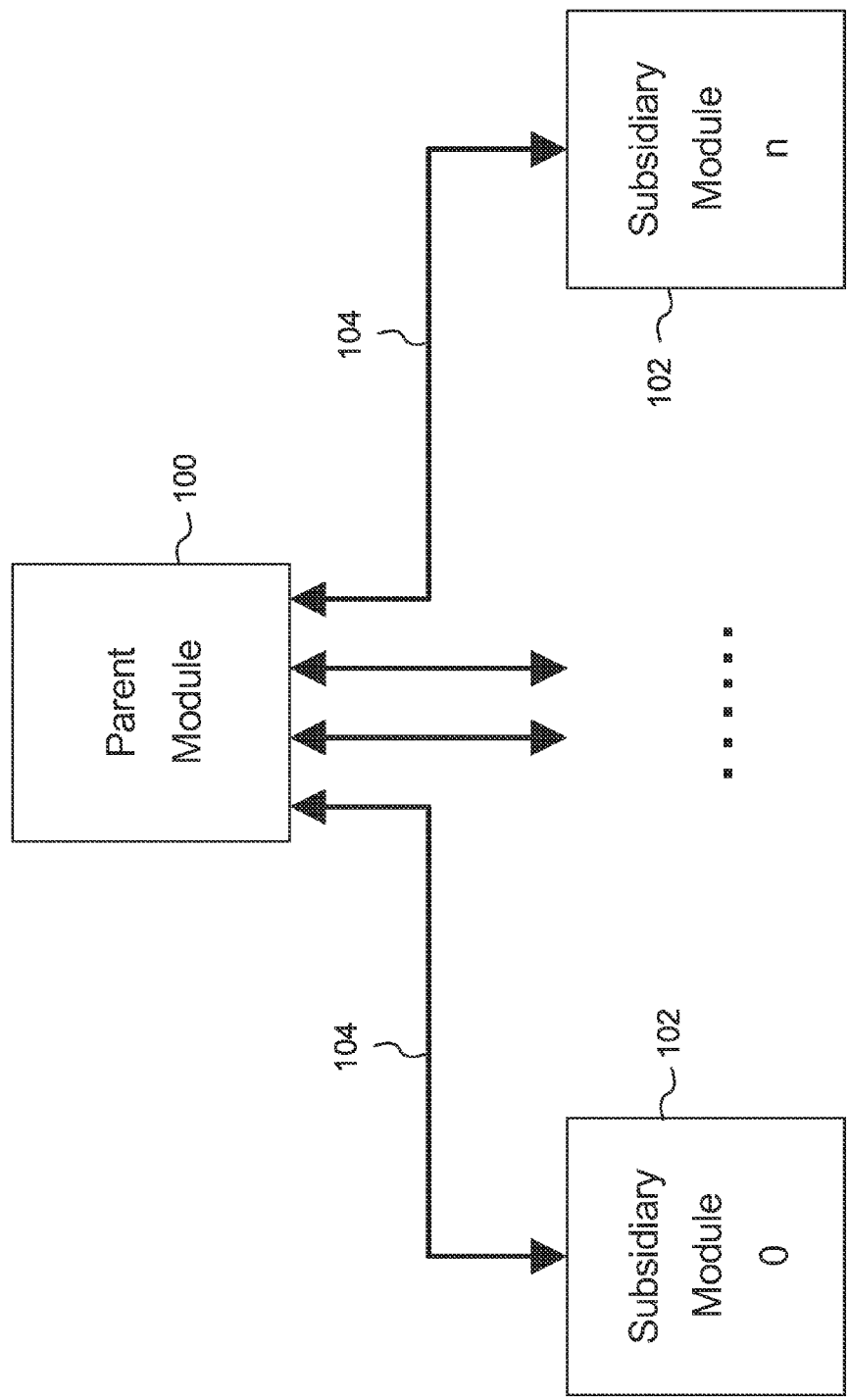
FIG. 1 is a functional diagram illustrating the interconnection between a parent module and a plurality of subsidiary modules in an embodiment of the invention.

With reference to FIG. 1, the present invention is a network architecture that includes a plurality of switching modules 100 arranged in a switched-tree configuration. FIG. 1 illustrates the basic structure of the switched-tree architecture, in which a parent module 100 is connected to a plurality of daughter or subsidiary modules 102. The subsidiary modules 102 can include functional modules, which are the "nodes" of the network, and/or additional switching modules that are connected to an even lower level of subsidiary modules.

As can be seen in FIG. 1, the switched-tree configuration is a tree-like or pyramid-like hierarchical structure which is repeated at each hierarchical level as shown in the Figure. The parent module 100 is always a switch module, which includes a sequencer and associated program memory, as is explained in more detail with reference to FIG. 4 below. The subsidiary modules 102 can include one or more functional modules (which typically include a memory interface), one or more switching modules, and/or one or more peripheral modules. Each subsidiary module 102 has a dedicated signal path 104 to its parent module. In various embodiments, the signal path 104 contains multiple sets of data and status buses.

Figure 2:
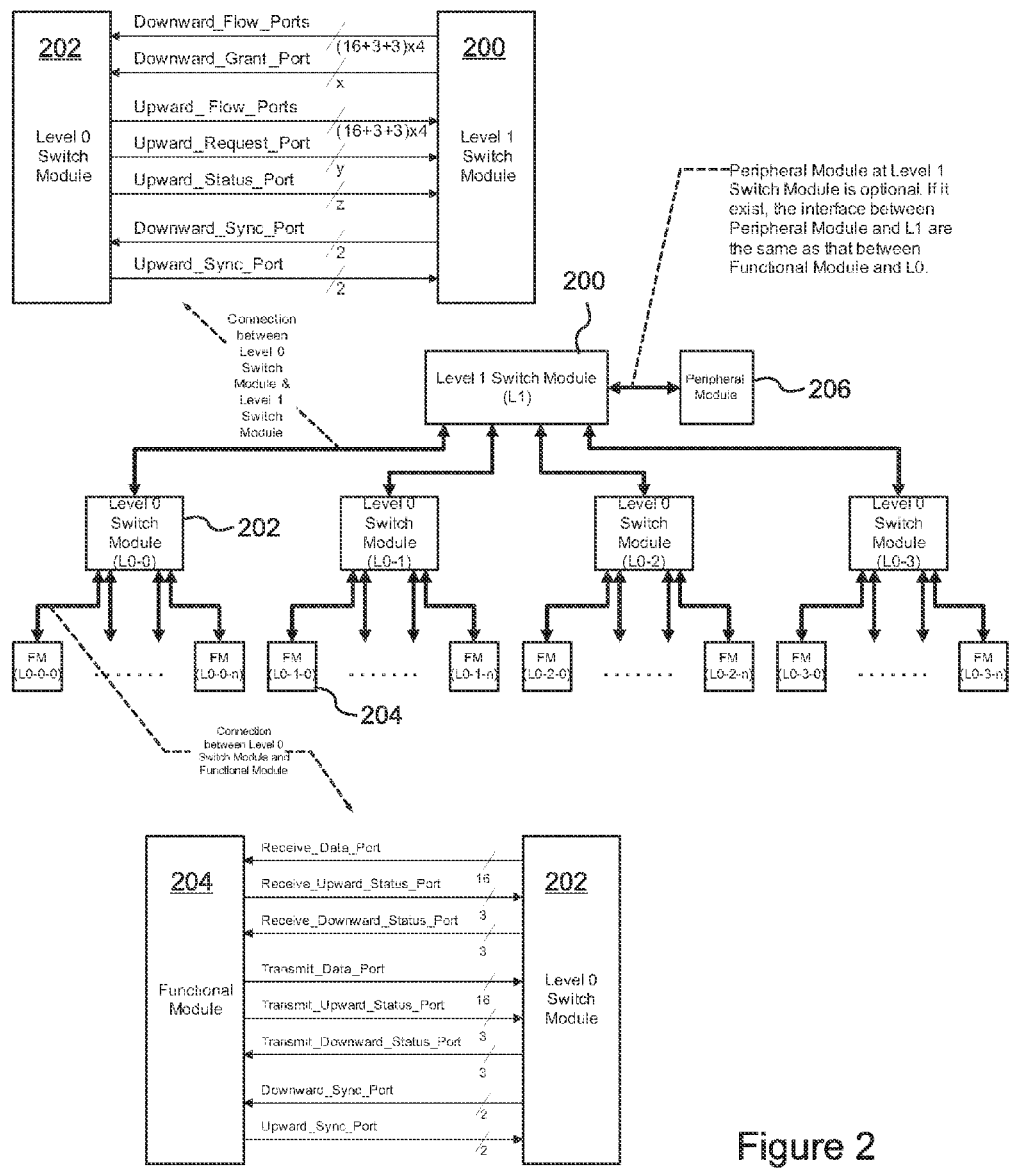
FIG. 2 is a functional diagram illustrating interconnection details between levels of switching modules and between switching modules and functional modules in a network of an embodiment having two levels of switching modules.

FIG. 2 illustrates an embodiment that includes two levels of switching, indicated as level 0 and level 1. The embodiment includes:
  4*(n+1) functional modules 204;
  4 Level 0 Switch Modules 202; and
  1 Level 1 Switch Module 200.

The interface between the functional modules (FM) 204 and the level 0 switch modules (L0) 202 in the embodiment of FIG. 2 includes three interface units:
  Receive Port—For FM 204 to receive data from L0 202
    Receive_Data_Port: Carries data words received by FM 204 from L0 202
    Receive_Upward_Status_Port: Carries status signals sent by FM 204 to L0 202
      For indicating its status for receiving data (e.g. Ready_To_Receive)

For backward flow control of this Receive Unit (e.g. Back_Pressure to indicate the Receive Unit cannot accept more data and the Transmit Unit needs to hold)

Receive Downward Status Port: Carries status signals sent by L0 202 to FM 204:
  For indicating the status of the packet connection through the Receive Unit (e.g. Connection_Grant)
  For forward flow control of this Receive Unit (e.g. Data_Valid, End_of_Packet)

Transmit Port—For FM to transmit data to L0 202
  Transmit_Data_Port: Carries data words or command words transmitted by FM 204 to L0 202
  Transmit_Upward_Status_Port: Carries status signals sent by FM 204 to L0 202
    For indicating its status for transmitting data (e.g. Ready_To_Transmit)
    For forward flow control of this Transmit Unit (e.g. Data_Valid, End_of_Packet)
  Transmit Downward Status Port: Carries status signals sent by L0 202 to FM 204
    For indicating the status of the packet connection through the Transmit Unit (e.g. Connection_Grant)
    For backward flow control of this Transmit Unit (e.g. Back_Pressure to indicate that the Receive Unit cannot accept more data and the Transmit Unit needs to hold)

Synchronization Port—For FM 204 and L0 202 establish synchronization
  Downward_Synchronization_Port:
    Carries signals to indicate to FM 204 that L0 202 is ready and waiting
    Carries signals for establishing a timing reference point
  Upward_Synchronization_Port: Carries signals to indicate to L0 202 that FM 204 is ready and waiting The interface in the embodiment of FIG. 2 between the level 0 switches L0 202 and the level 1 switch module L1 200 includes three interface units:
Downward Port
  Downward_Flow_Ports: Carry the data words, forward flow control status signals, and backward flow control status signals transmitted by L1 200 to L0 202
  Downward_Grant_Port: Carries grant signals from L1 200 to L0 202 to indicate specific packet connections being granted
Upward Port
  Upward_Flow_Port: Carries data words, command words, forward flow control status signals, and backward flow control status signals transmitted by L0 202 to L1 200
  Upward_Request_Port: Carries requests for packet connections
  Upward_Status_Port: Carries the status of L0 202 and its Subsidiary Modules as sources and destinations for possible pending packet connections in the system
Synchronization Port—For L0 202 and L1 200 establishes synchronization
  Downward_Synchronization_Port:
    Carries signals to indicate to L0 202 that L1 200 is ready and waiting
    Carries signals for establishing a timing reference point
  Upward_Synchronization_Port: Carries signals to indicate to L1 200 that L0 202 is ready and waiting FIG. 3A illustrates a hardware design for an embodiment having three levels of switching, including:
  16*(n+1) functional modules 306;
  16 L0 switch modules 304;
  4 L1 switch modules 302; and
  1 L2 switch module 300.

Figure 3A:
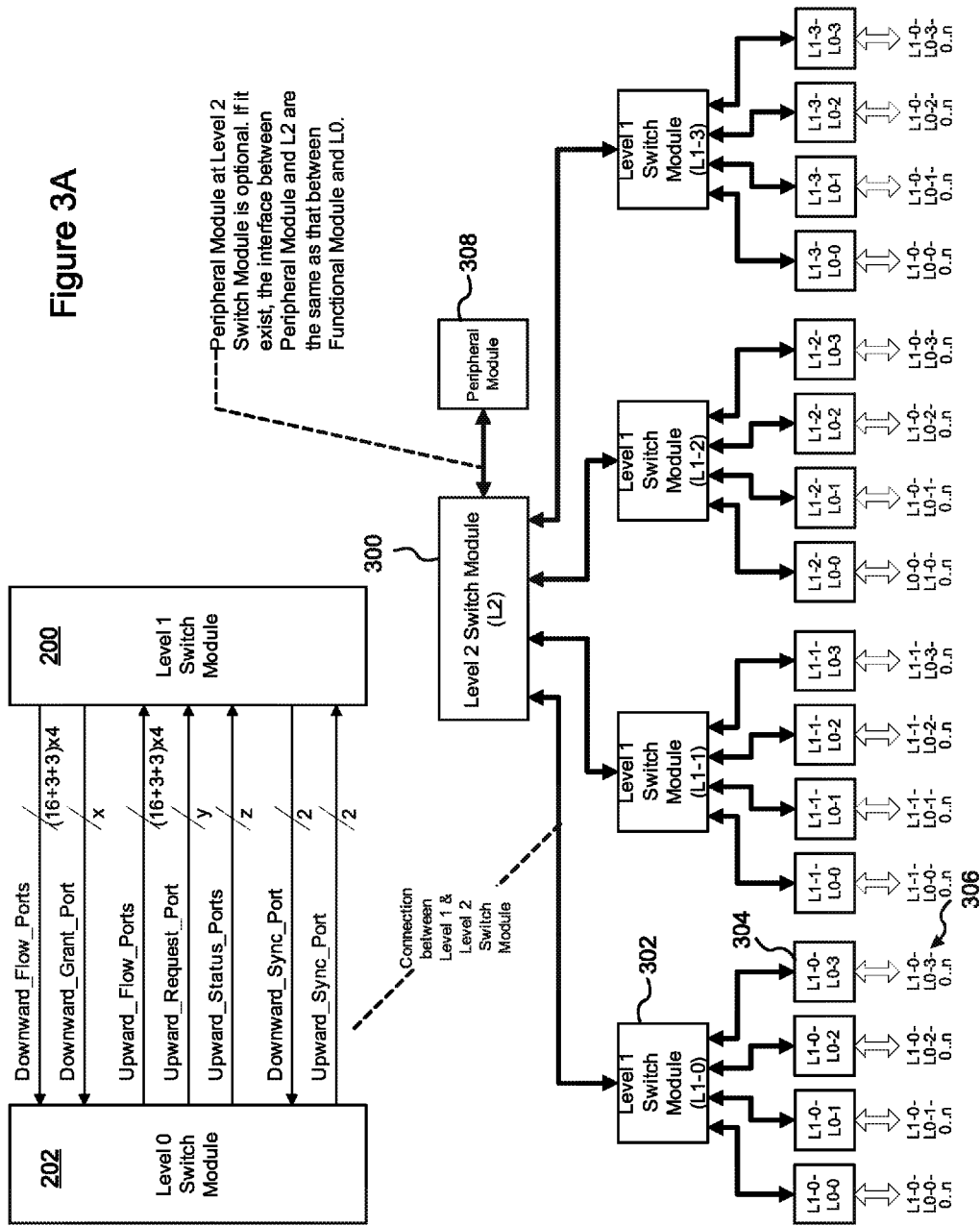
FIG. 3A is a functional diagram illustrating interconnection details between levels of switching modules in a network of an embodiment having three levels of switching modules.

According to the principles illustrated in FIG. 2 and FIG. 3A, the hardware design can be scaled to even more levels of switching while two of the basic hardware structures remain unchanged, namely:
  The interface between each parent switch module and its subsidiary switch modules; and
  The design of the switch modules at different hierarchical levels from level 1 and up.

Figure 3B:
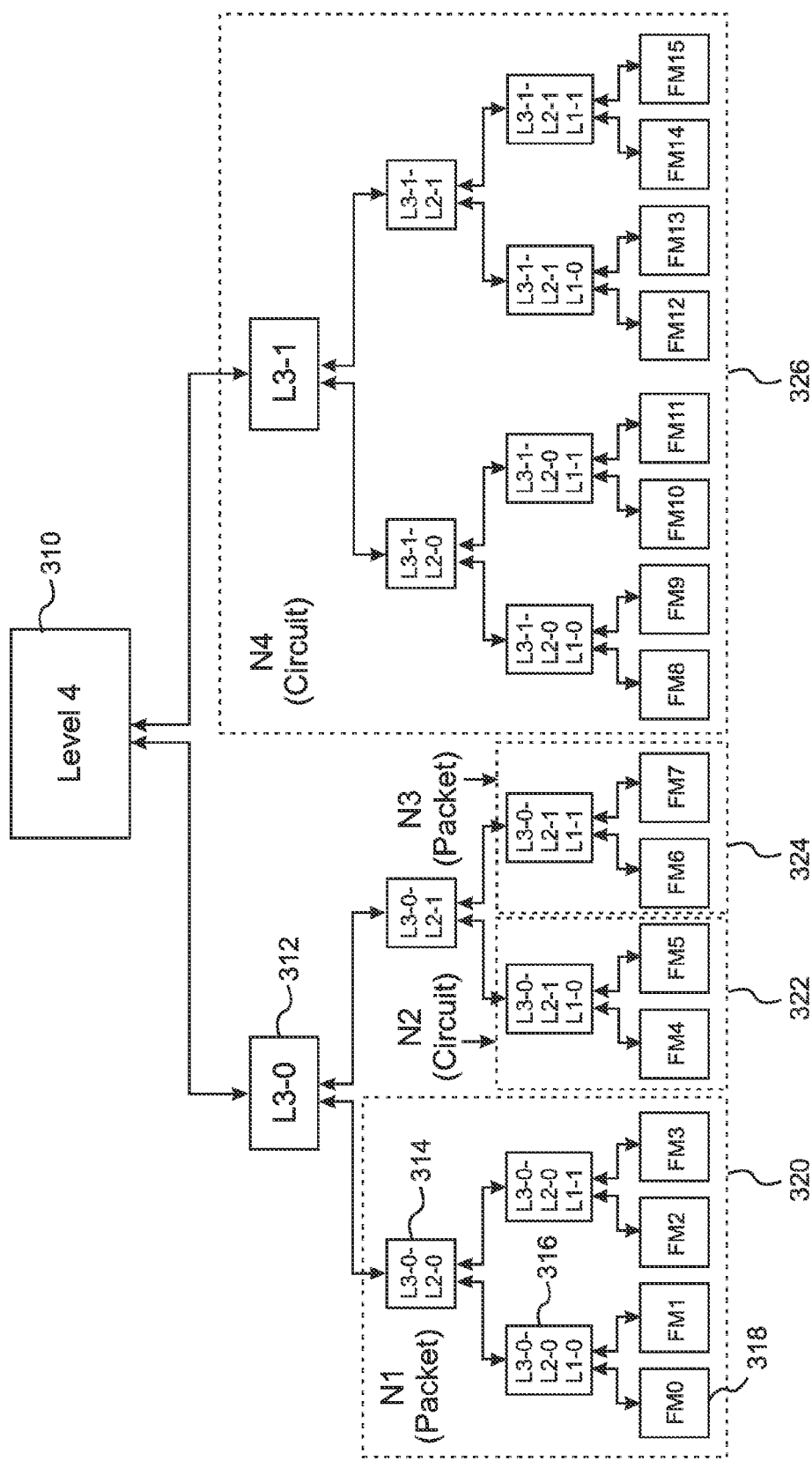
FIG. 3B is a functional diagram illustrating grouping of switching modules and functional modules into a plurality of networks operating in parallel and in different modes in an embodiment of the present invention.

For example, FIG. 3B illustrates an embodiment having four levels of switching 310, 312, 314, 316 above a layer of functional module 318. For simplicity of illustration, only two subsidiary switching modules are illustrated in FIG. 3B for each parent switching module. In each case, allocating a plurality of switching modules to a circuit-switched network or a packet-switched network includes selecting a specific switching module at a specific level of the switching hierarchy to be the parent module of the new network, and then assigning to the network the selected parent module and all subsidiary switch modules that are connected to the parent module at lower levels down to level 0. This can be considered a global resource allocation for a switching tree with a specific root, where the root can be at any level of the hierarchy.

In the example of FIG. 3B, the plurality of switching modules has been configured by software into four networks 320, 322, 324, 326. The first network 320 is a packet-switched network based on root switching module L3-0-L2-0, which is located in level 2, and including all switching modules which are subsidiary to the root. The second network 322 is a circuit switched network based on root switching module L3-0-L2-1-L1-0, which is located in level 1. The third network 324 is a packet switched network based on root switching module L3-0-L2-1-L1-1, which is located in level L1. And the fourth network 326 is a circuit switched network based on root switching module L3-1, which is located in level L3.

Figure 4:
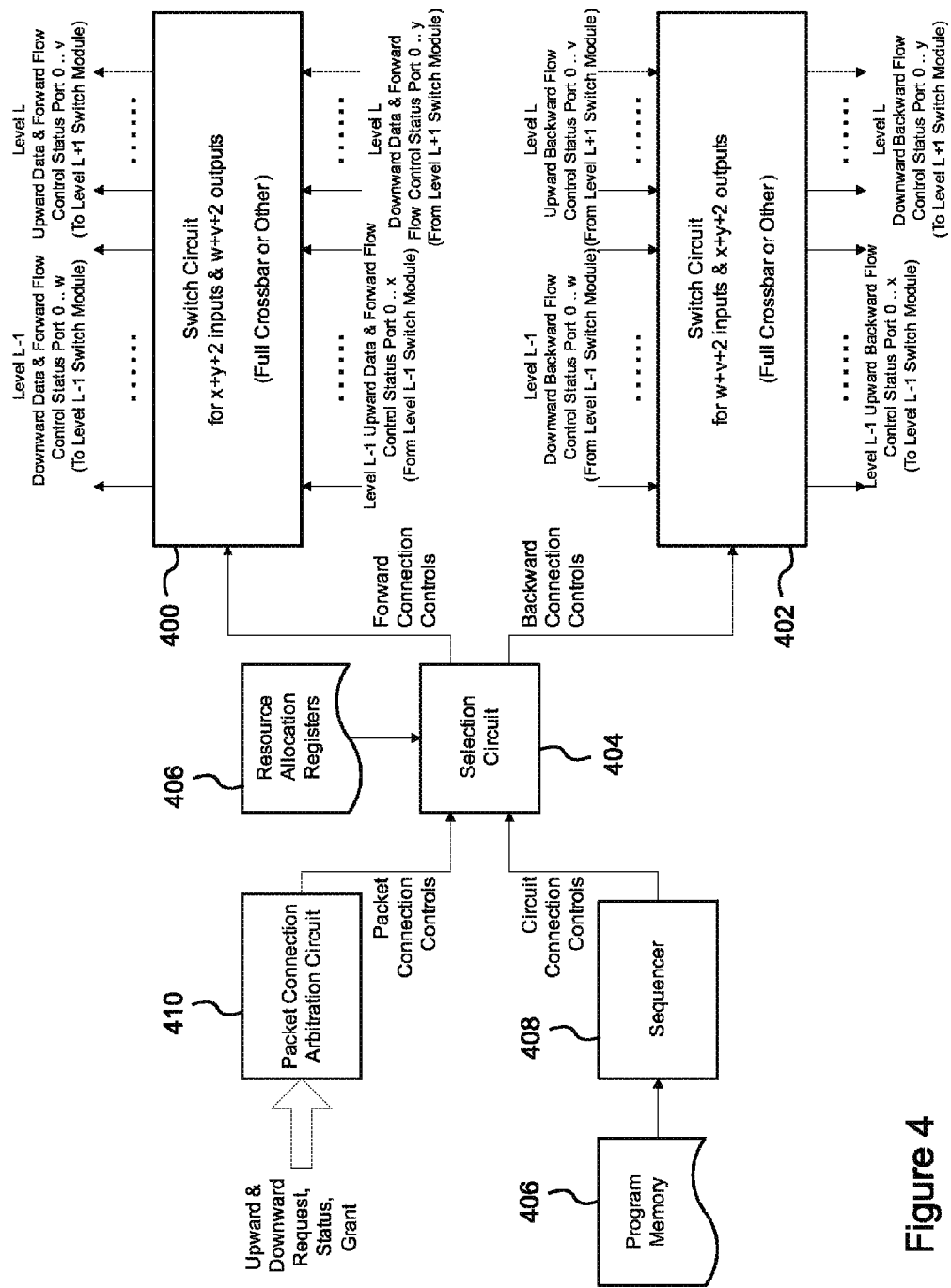
FIG. 4 is a functional diagram illustrating internal architecture in a switching module, including circuitry for selecting between circuit-switched and packet-switched operation modes in an embodiment of the present invention.

With reference to FIG. 4, in various embodiments the hardware design of each switch module includes connectivity resources 400, 402 such as crossbar switches, multiplexers, relays, and such like that can be dynamically allocated for use in establishing a circuit-switched network or a packet-switched network.

FIG. 4 illustrates the hardware structure of a switching module in an embodiment of the present invention. The structure includes a selection circuit 404 which is used to switch the operation of the switching module between its circuit-switching mode and its packet-switching mode.

Regardless of whether the switching module is in its circuit-switching mode or its packet-switching mode, each connection through the switching module in the embodiment of FIG. 4 from source to destination includes a pair of paths:
  a forward path 400 which carries the data being transmitted and the forward flow control signals; and
  a backward path 402 which carries the backward flow control signals Therefore, at each switch module, there is a pairing of forward path (switched by upper switch circuit 400 in FIG. 4) and a backward path (switched by lower switch circuit 402 in FIG. 4). The switching of the pair 400, 402 in the embodiment of FIG. 4 must be consistent.

Resource allocation in the embodiment of FIG. 4 is accomplished through dividing the control of all the ports. As shown in FIG. 4, the resource allocation registers 406 define the control for each port. Each port is controlled by either a sequencer program 408 for circuit switched connection or a packet connection arbitration circuit 410. Specifically, the following ports will be allocated to either circuit switching or packet switching—

All Transmit Ports

All Receive Ports

At each level L switch module—all the upward ports to transmit to the level L+1 switch module, and all the downward ports to receive from the level L+1 switch modules (0<=l<=h−1 where level h is the highest level in the system)

Note that, in FIG. 4 for L=0:

The Upward Port of Level L−1 is the Transmit Port of the Functional Module;

The Downward Port of Level L−1 is the Receive Port of the Functional Module;

the Upward Request and Status are captured as commands on the Transmit_Data_Port; and The port status is captured on the Transmit_Upward_Status_Port and the Receive_Upward_Status_Port.

Network Configuration Process

Network configurations can be dynamically changed during program execution. A network configuration includes:

The allocation of connectivity resources between circuit switched networks and packet switched networks across a fixed number of levels from the lowest level in the switching hierarchy.

The program sequences for the circuit switched network across the same levels of switching hierarchy for all involved switch modules.

In various embodiments, a specific synchronization process has to be followed to change from an existing network configuration to a new network configuration. FIG. 5Error! Reference source not found. illustrates this process for an embodiment of the present invention.

Figure 5:
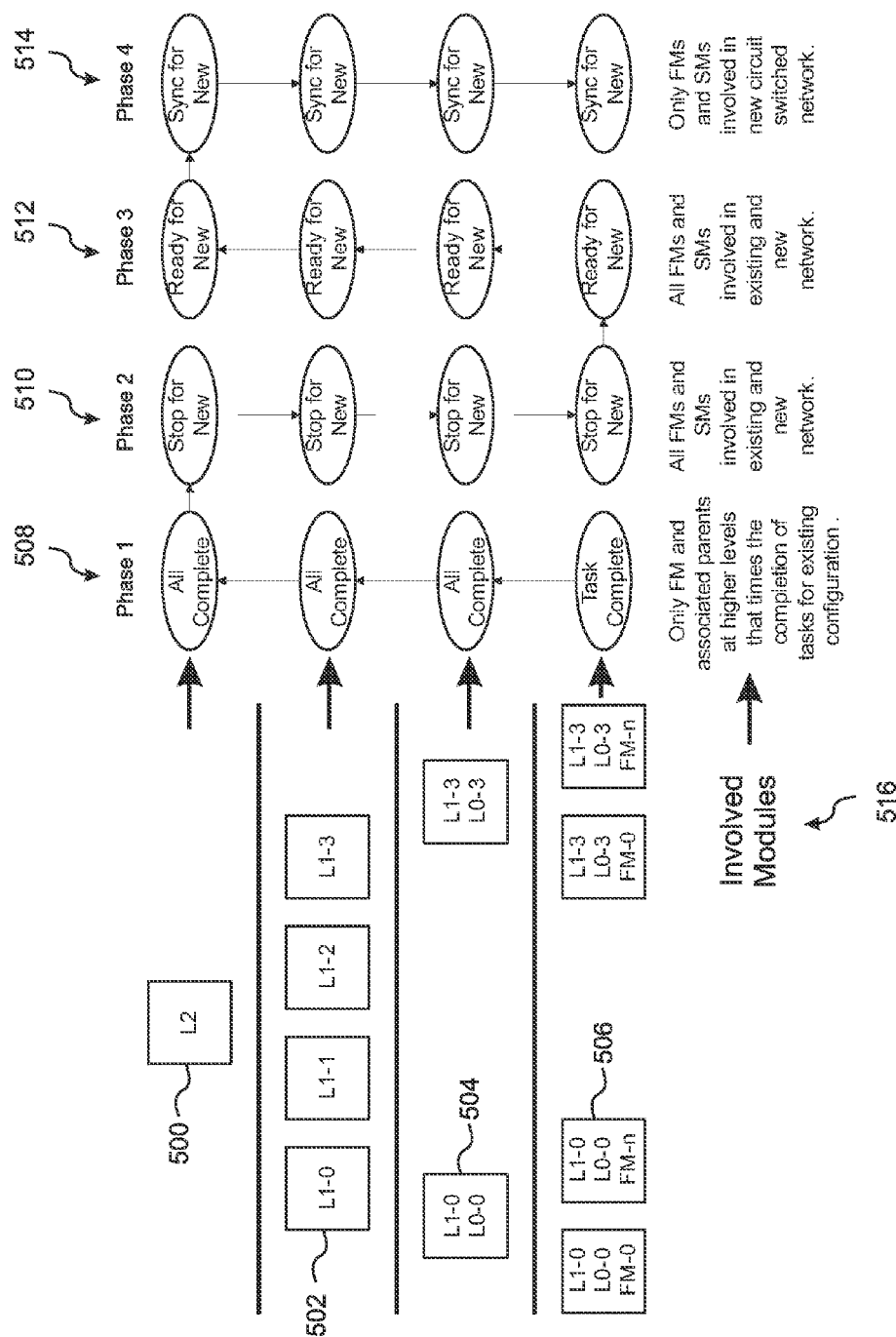
FIG. 5 is a functional diagram illustrating steps required at each switching level for stopping a network and creating and starting a new network in an embodiment of the present invention.

In the embodiment of FIG. 5 there are four phases 508, 510, 512, 514 in changing the network configuration:

Phase 1 508: Functional Modules (FMs) 506 hierarchically notify upper level switching modules 504 regarding the completion of certain tasks which will trigger the change to a new network configuration. The notification is forwarded by the switching modules 504 up to the root 500 of the existing network configuration. The root Switch Module 500 can monitor one or more completion signals from one or more FM's 506. If a network configuration is explicitly timed by the root 500 (e.g. run the circuit switching loop of 9 cycles for 100 iterations), this phase can be skipped.

Phase 2 510: The root Switch Module (SM) 500 signals the associated SM's 502, 504 and FM's 506 at lower levels of the network to stop the current network configuration and prepare for a new network configuration. Upon receiving this signal, any SM's 500, 502, 504 and FM's 506 involved in the existing circuit-switched network will exit the circuit switching loop. Upon exiting the current circuit switching loop, if applicable, each SM 500, 502, 504 will allocate its resources between circuit switched networks and packet switched networks. Note that once a switching resource 500, 502, 504 is allocated to a packet switched network, a packet connection can be established on demand, requiring only programming of the source and destination Functional Modules 506.

Phase 3 512: Upon completion of resource allocation for the new network configuration and reception of ready signals from all Subsidiary Modules 502, 504, 506, if they exist, each Module 502, 504, 506 will notify its Parent Module that it is ready for the new network configuration.

Phase 4 514: If the new network configuration is to be a circuit-switched network, a synchronization pulse will be sent by the root module 500 down the hierarchy to establish a timing reference for circuit switching program sequences.

After Phase 4, the system is ready to execute circuit switching program sequences, if it is a circuit-switched network, or accept on-demand packet connection requests, if it is a packet-switched network, for the new network configuration.

Figure 6:
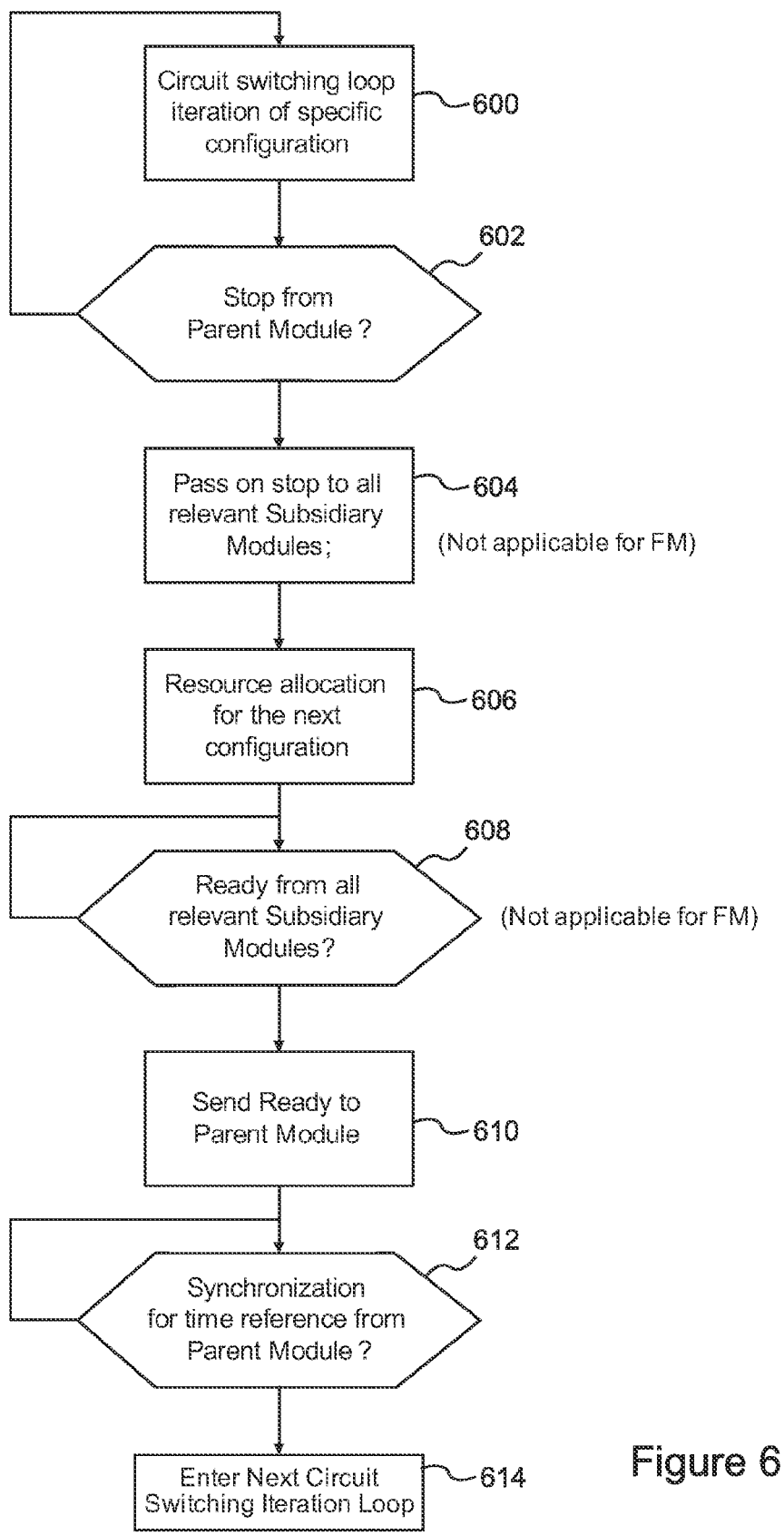
FIG. 6 is a functional diagram illustrating the steps of FIG. 5 from the standpoint of a single switching module.

FIG. 6 shows the process of FIG. 5 from the standpoint of an individual Switch Module 500, 502, 504. The switch module continues to repeat its assigned function according to the existing configuration 600 until it receives a stop signal from its parent module 602, at which time it stops and (if the network is a circuit-switched network) passes the stop signal on to all of its subsidiary modules 604. The switch module then accepts new allocation instructions for the next configuration 606, and if the switch module is part of a circuit-switched network, it waits to receive ready signals from all of its subsidiary modules that are also part of the circuit-switched network 608, at which point it passes a ready signal back to its parent module 610. The switch module then synchronizes itself with a time reference signal from the parent module 612, at which point it begins operation as part of the new network 614.

Circuit Switched Connection and Hardware Mechanism

To establish a circuit switched connection, a source node will be connected with a destination node through a series of switching modules. In some embodiments, all circuit-switched connections in the network will share allocated physical connectivity resources in a time division multiplexed (TDM) fashion. In some of these embodiments, the bandwidth for a specific connection is fixed (e.g. two 16-bit data packets every 5 cycles from L1-0, L0-0, FM-3 to L1-2, L0-3, FM-4), and the delay for a specific connection is also fixed.

In various embodiments, to enable the time division multiplexed sharing of resources, the Switch Modules involved in a circuit switched network or sub-network (with a single root at a specific switching level) run synchronized programs of periodic TMD switching patterns.

Figure 7:
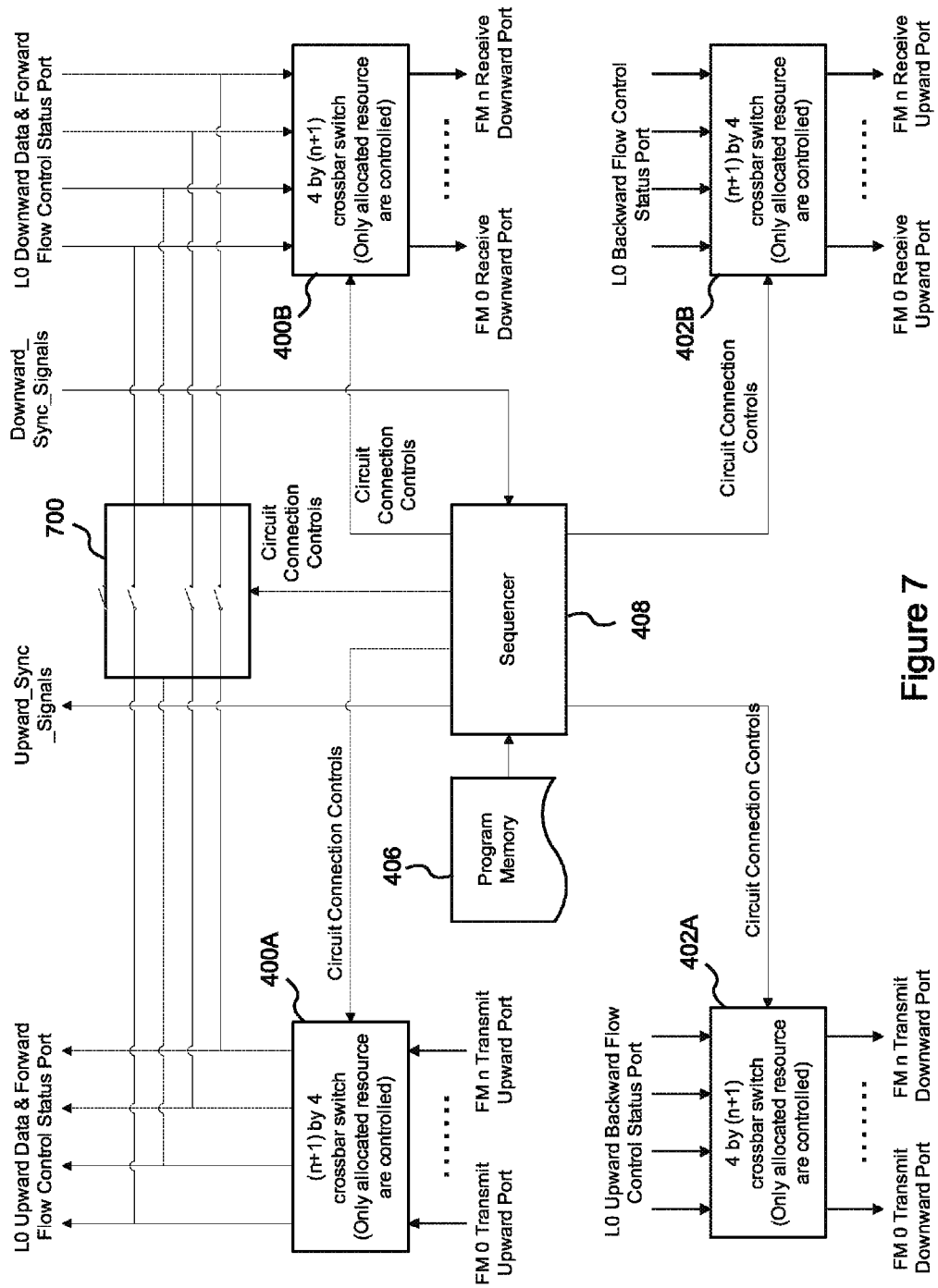
FIG. 7 is a functional diagram illustrating the hardware mechanism for Level 0 switch modules for a circuit-switched network in an embodiment of the present invention.
Figure 8:
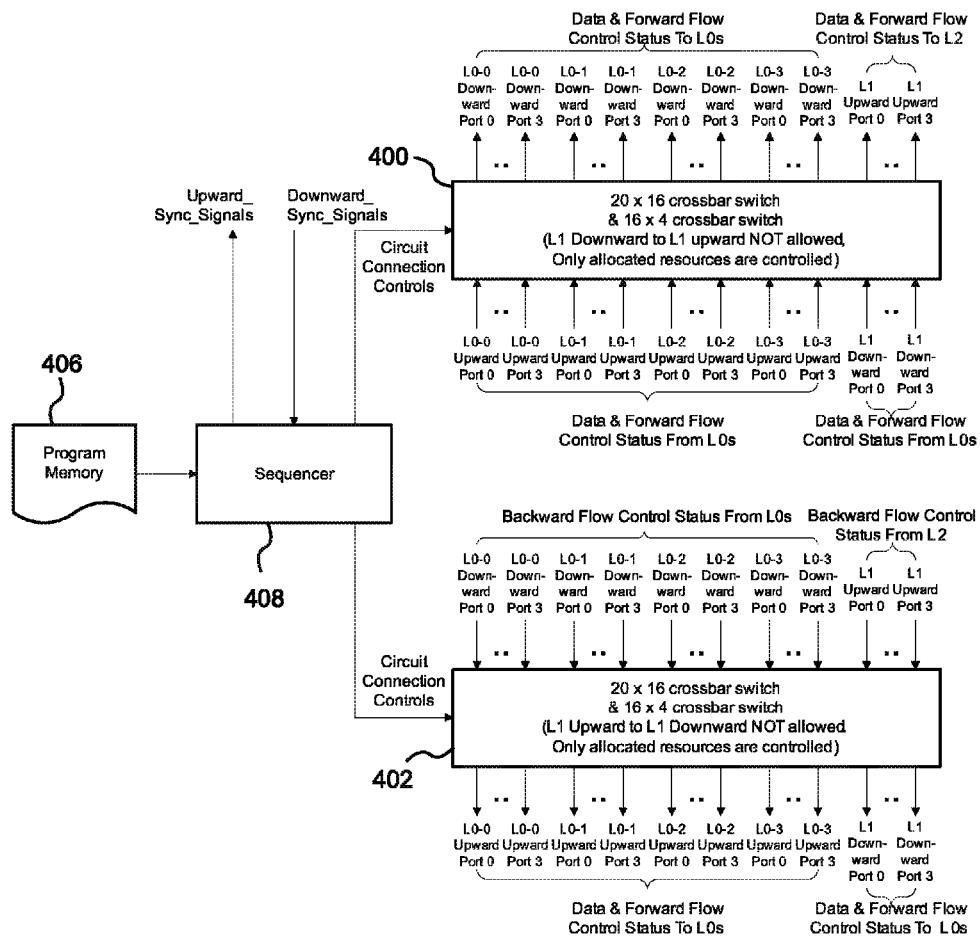
FIG. 8 is a functional diagram illustrating the hardware mechanism for Level 1 switch modules for the embodiment of FIG. 7.

FIG. 7 and FIG. 8 illustrate the hardware mechanisms for Level 0 and Level 1 Switch Modules respectively for circuit switching in an embodiment of the present invention. For Level 0 (FIG. 7), the functionality of switching circuit item 400 of FIG. 4 is divided into two crossbar switches 400A and 400B, and the functionality of switching circuit item 402 of FIG. 4 is divided into two crossbar switches 402A, 402B. Additional circuit connection controls 700 provide direct connectivity between subsidiary functional modules of the switching module. The packet connection arbitration circuit 410, resource allocation registers 406, and selection circuit 404 have been omitted from FIGS. 7 and 8, but would be physically present even if not used while the switching module was assigned to a circuit-switched network.

Circuit Connection Example

In various embodiments, a circuit-switched connection can be defined by the following parameters:

Source Node—a single node;

Destination Nodes—a single node for unicast, multiple nodes for multicast; and

Bandwidth requirement—defined as the number of connection cycles b in a global period of p cycles.

Once these parameters have been defined, the circuit switching requirement for the connection is defined. According to an embodiment in which the delay for each level of switching is one cycle, FIG. 9 illustrates how such a switching requirement can be determined. Note that the term "outport" is used in the figure as a short-hand notation for an output port, and similarly the term "inport" is used as a shorthand notation for an input port. Note also that resources are tracked between each interface Subsidiary Module and its Parent Module. For each Switch Module having both a Parent Module and a Subsidiary Module, multiple Subsidiary Modules can compete for the limited number of ports available to interface with the parent. This port usage is tracked.

Software Tools for Matching Bandwidth Requirement with Switching Sequences

In embodiments, software tools are included that seek to find a switching pattern of p cycles for all involved Switch Modules where each desired connection has its requested connection cycles and the port constraints are not violated in any cycle. The steps are:

For each unicast connection with a single-cycle connection at its source at cycle t, the resource requirement for all Switch Modules from t to t+ delay can be uniquely identified ("delay" is the transmission delay from source node to destination node).

For each multicast connection with a single-cycle connection at its source at cycle t, the resource requirement for all Switch Modules from t to t+ max_delay can be uniquely identified (max_delay is the maximum of transmission delay from source node to each destination node).

For each connection requiring n cycles of connection at the source, the time of connection cycles within period p can be varied so that the summation of all resource requirement is within constraints.

This can be done by a search algorithm. The following is a formulation of the search problem based on the hardware design of 3-level switching of L0, L1, L2 in the embodiment described above:

Input of the search problem:
Define p as the global period in cycles:
Define a unicast connection i as
  (fms[i], l0s[i], l1s[i]), (fmd[i], l0d[i], l1d[i]), b[i] where
    (fms[i], l0s[i], l1s[i]) is the source identifier;
    (fmd[i], l0d[i], l1d[i]) is the destination identifier; and
    b[i] is the connection cycles
  Note: Source and destination cannot be the same node
Define a multicast connection j with m destination as
  (fms[j], l0s[j], l1s[j]), (fmd[j,0] l0d[j,0], l1d[j,0]), . . . , (fmd[j,m], l0d[j,m], l1d[j,m]), b[i] where
    (fms[j], l0s[j], l1s[j]) is the source identifier;
    (fmd[j,k], l0d[j,k], l1d[j,k]) (o<=k<=m) is the kth destination identifier; and
    b[i] is the connection cycles
  Note: The source and destination cannot be the same node, each destination is distinct
Variables for the Search Algorithm:
(Note: t~a is defined as (t−a)mod p)
Define independent Boolean variable c(t,x) as connection x is connected at source in cycle t
Define the following dependent variables for unicast
  l0s_out_u (l0[s],t,i) as l0s[i] uses an output port to l1 for unicast connection i in cycle t
    l0s_out_u (l0s[i],t,i)=c(t~1,i)
  l1s_out_u (l1s[i],t,i) as l1s[i] uses an output port to l2 for unicast connection i in cycle t
    l1s_out_u (l1s[i],t,i)=(l1s[i] !=l1d[i]) & c(t~2,i)
  l1d_in_u (l1[d],t,i) as l1d[i] uses an input port from l2 for unicast connection i in cycle t
    l1d_in_u (l1d[i],t,i)=(l1s[i] !=l1d[i]) & c(t~4,i)
  l0d_in_u (l0d[i],t,i) as l0d[i] uses an input port from l1 for unicast connection i in cycle t
    l0d_in_u (l0d[i],t,i)=((l1s[i] !=l1d[i]) & c(t~5,i))|
      ((l1s[i]==l1d[i]) & (l0s[i] !=l0d[i]) & c(t~3,i))|
      ((l1s[i]==l1d[i]) & (l0s[i]==l0d[i]) & c(t~1))
Define the following dependent variables for multicast
  l0s_out_m (l0s[j],t,j) as l0s[j] uses an output port to l1 for multicast connection j in cycle t
    l0s_out_m (l0[j],t,j)=c(t~1,j)
  l1s_out_m (l1s[j],t,j,k) as l1s[j] uses an output port to l2 for multicast connection j destination k in cycle t
    l1s_out_m (l1s[j],t,j,0)=(l1s[j] !=l1d[j,0]) & c(t~2,j)
    For 1<=k<m
      If for any 0<=x<k, (l1d[j,x]==l1d[j,k]), l1s_out_m (l1s[j],t,j,k)=0
      Else l1s_out_m (l1s[j],t,j,k)=c(t~2,j)
  l1d_in_m (l1d[j],t,j,k) as l1d[i] uses an input port from l2 for multicast connection j destination k in cycle t
    l1d_in_m (l1d[j,0],t,j,0)=(l1s[j] !=l1d[j,0]) & c(t~4,j)
    For 1<=k<m
      If for any 0<=x<k, (l1d[j,x]==l1d[j,k]), l1d_in_m (l1s[j,k],t,j,k)=0
      Else l1s_out_m (l1s[j],t,j,k)=c(t~4,j)
  l0d_in_m (l0d[j],t,j,k) as l0d[j] uses an input port from l1 for multicast connection j destination k in cycle t
    l0d_in_m (l0d[j,k],t,j,k)=((l1s[j] !=l1d[j,k]) & c(t~5,i))|((l1s[j]==l1d[j,k]) & (l0s[j] !=l0d[j,k]) & c(t~3,i))|((l1s[j]==l1d[j,k]) & (l0s[j]==l0d[j,k]) & c(t~1))

Search Constraints

For all i, $$\sum_{0<=t<p} c(t, i) = b[i]$$

For all j, $$\sum_{0<=t<p} c(t, j) = b[j]$$

For each t, 0<=t<p and each unique l0s==l0s[i]==l0s[j] over all i and j $$\sum_i l0s\_out\_u(l0s[i], t, i) + \sum_j l0s\_out\_m(l0s[j], t, j) <= l0s\_out\_ch(l0s)$$

Where l0s_out_ch(l0s) is the output channels allocated in l0s for circuit switched network For each t, 0<=t<p and each unique l1s==l1s[i]==l1s[j] over all i and j $$\sum_i l1s\_out\_u(l1s[i], t, i) + \sum_{j,k} l0s\_out\_m(l1s[j], t, j, k) <= l1s\_out\_ch(l1s)$$

Where l1s_out_ch(l1s) is the output channels allocated in l1s for circuit switched network For each t, $0<=t<p$ and each unique $l1d==l1d[i]==l1d[j,k]$ over all i, j, and k $$\sum_i l1d\_in\_u(l1d[i], t, i) + \sum_{j,k} l1d\_in\_m(l1d[j,k], t, j, k) <= l1d\_in\_ch(l1d)$$

Where l1d_out_ch(l1d) is the input channels allocated in l1d for circuit switched network For each t, $0<=t<p$ and each unique $l0d==l0d[i]==l0d[j,k]$ over all i, j, and k $$\sum_i l0d\_in\_u(l0d[i], t, i) + \sum_{j,k} l0d\_in\_m(l0d[j,k], t, j, k) <= l0d\_in\_ch(l0d)$$

Where l0d_out_ch(l1d) is the input channel allocated in l0d for circuit switched network This is now a Satisfiability Modulo Theories (SMT) problem that can be solved by a standard satisfiability solver.

Packet Switched Connection and Hardware Mechanism

In various embodiments, packet-switched connections are established on demand using resources allocated to packet-switched networks. Both data sources and data destinations can request packet connections using Push or Pull commands respectively. Requests in various command formats can be sent to the Switch Modules by program sequences in the Functional Modules. Dedicated circuit blocks in the Switch Modules can arbitrate when multiple requests are received simultaneously, and for each request can either grant the request or notify the sender of the request that the system has no resources available for establishing the requested packet connection. In various embodiments, once a packet connection has been granted, a physical connection will be established between the data source and data destination for:

Forward data transmission;
Forward flow control status transmission; and
Backward flow control transmission.

This physical connection will be torn down once the packet transfer has been complete and the data source has sent out an end_of_packet signal on its forward flow control port. At that point, all resources used by this connection will be release back to the pool of allocated and free resource.

The following illustrates a command format in an embodiment. Commands are sent by Functional Modules on the Transmit_Data_Port and the Transmit_Upward_Status_Port in multi-word format in the order shown. Each command word on the Transmit_Data_Port is accompanied by a cmd_valid status on the Transmit_Upward_Status_Port.

First Word (Bits[31:0] of the Command)

| 31...30 | 29 | 28 | 27 | 26 | 25 | 24 | 23 | 22...16 | 15...8 | 7...0 |
|---|---|---|---|---|---|---|---|---|---|---|
| type | Ps/pl | src mst | dst add | pri | int | rsv | rsv | remote id | Src desp | Dst desp |

[31:30]: Command type. 2'b00—unicast
    2'b01—multicast
    2'b10—stripe
[29]: 0—Push, 1—Pull
    For multicast, only push is supported
[28]: The transaction master at data source
    0—Data source or Peripheral Functional Module drives data transaction
    1—Switch Module drives data transaction. Switch Module generates read enable and read address

[27]: Destination address generation
    0—Write address is generated by destination Functional or Peripheral Module.
    1—Write address is generated by Switch Module
[26]: Command priority
    0—low priority
    1—high priority
[25]: Interrupt enable
    0—don't generate interrupt when command is done
    1—Generate interrupt when command is done
[24]: Reserved
[23]: Reserved
[22:16]: Remote Module ID, for a push command, it is the data destination ID, for a pull command, it is the data source ID
    [22]=0, the remote Module is a Functional Module
        [21:20]: L1 ID
        [19:18]: L0 ID
        [17:16]: Reserved
    [22]=1, the remote unit is external Peripheral
        [21:16]: reserved
[15:8]: Addressing descriptor pointer at source. Used when the Switch Module generates read address at data source
[7:0]: Addressing descriptor pointer at destination. Used when the Switch Module generates write address at the destination Second Word (Bits[63:32] of the Command)—Fields for Data Source

| 31 | | 0 |
|---|---|---|
| (Source)Peripheral start address/Functional Module Mask/Start address | | |

When the remote unit is a Peripheral Module ($1^{st}$ word [22]=1) and the command is a pull ($1^{st}$ word [29]=1):
[31:0]: Source (Peripheral) start address
For all other cases, Functional Module(s) is/are the source:
[31:20]: Reserved
[19:11]: Functional Module mask—only 1 bit of this field can be set, except for stripe commands
[10:0]: Source start address Third Word (Bits[95:64] of the Command)—Fields for Data Destination

| 31 | 30 | 29 | 28 | 27 | 0 |
|---|---|---|---|---|---|
| (Destination)Peripheral start address/Functional Module Mask/Start address | | | | | |

When the remote unit is a Peripheral Module ($1^{st}$ word [22]=1) and the command is a pull ($1^{st}$ word [29]=1):
[31:0]: Destination (Peripheral) start address
For all other cases, Functional Module(s) is/are the source:
[31:21]: reserved

[20]: 0—Data destination is Functional Module,
    1—Data destination is command FIFO
If the destination is a Functional Module (s) (bit[20]=0)
    [19:11]: Destination Functional Module mask
    [10:0]: Destination start address
If the destination is a command FIFO (bit[20]=1)
    [19:0] Reserved
    For multicast commands, 1 to 3 or more additional words are needed:
    Forth/Fifth/Sixth Word (Bits[127:96]/Bits[159:128]/Bits [191:160])
    (Each word describes a new destination/path of the multicast command)

| 31...26 | 25 | 24 | 23...20 | 19...11 | 10...0 |
|---|---|---|---|---|---|
| Rsv | last | addr | L1, L0 ID | FM mask | start addr |

[31:26]: Reserved
[25]: 0—This word is not the last
    1—This word is the last
[24]: Reserved
[23:20]: Destination L1 ID, L0 ID
[19:11]: Functional Unit mask
[10:0]: Start address Hierarchical Arbitration of Commands for Packet-Switched Networks In various embodiments, depending on the source and destination(s) for each packet connection requested, the request must go up to a specific switching level to be arbitrated. There can be many different requests in a system to be arbitrated at any time. A time-synchronous method is used in some embodiments to arbitrate requests for different destination groups, whereby switching levels are selected synchronously and sequentially for arbitration.

Figure 10:
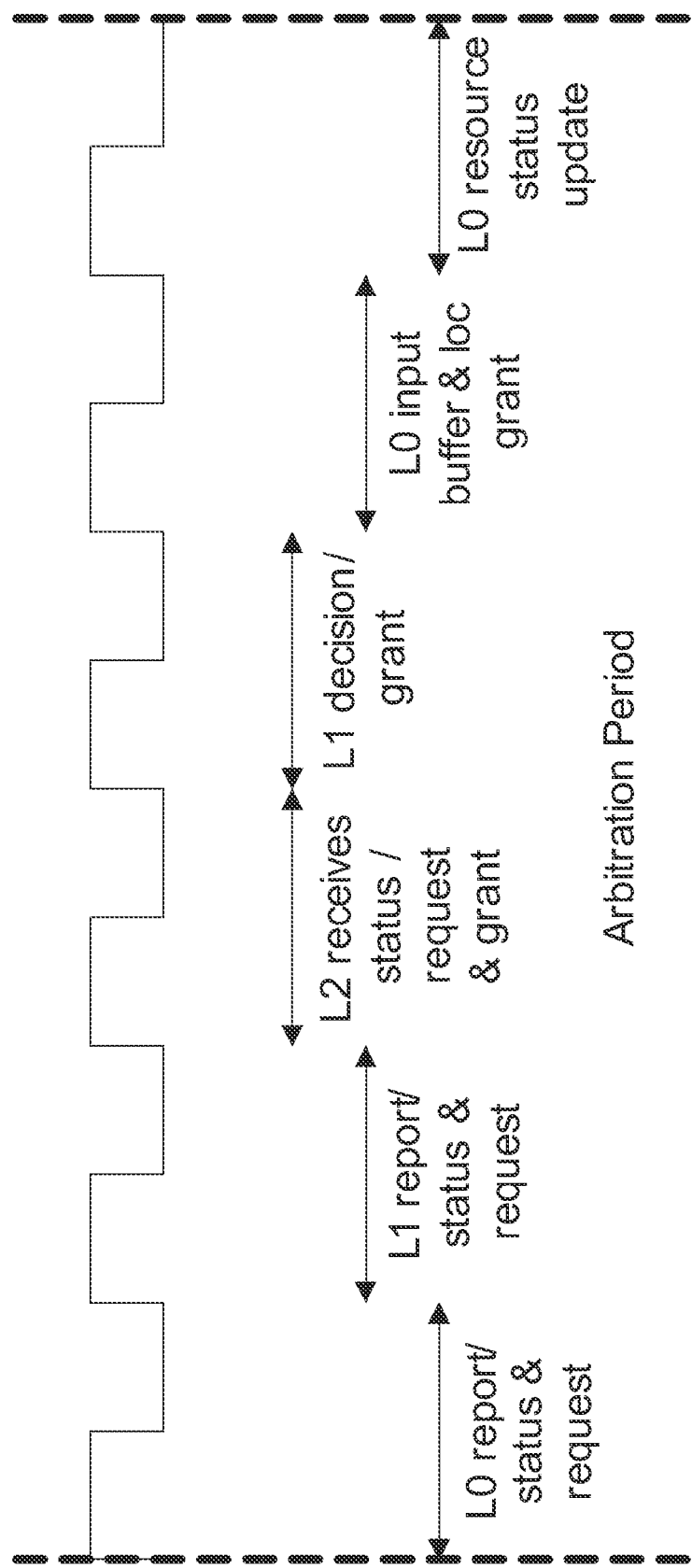
FIG. 10 is a functional diagram illustrating an arbitration period having 6 clock cycles for three levels of switching in an embodiment of the present invention.

In some of these embodiments, the system has a fixed arbitration period of 2*n cycles for n levels of switching, so as to ensure that a request can be sent from the lowest level to the highest level of switching and back down to the lowest level within one arbitration period. FIG. 10 illustrates such an arbitration period having 6 clock cycles for three levels of switching.

Figure 11:
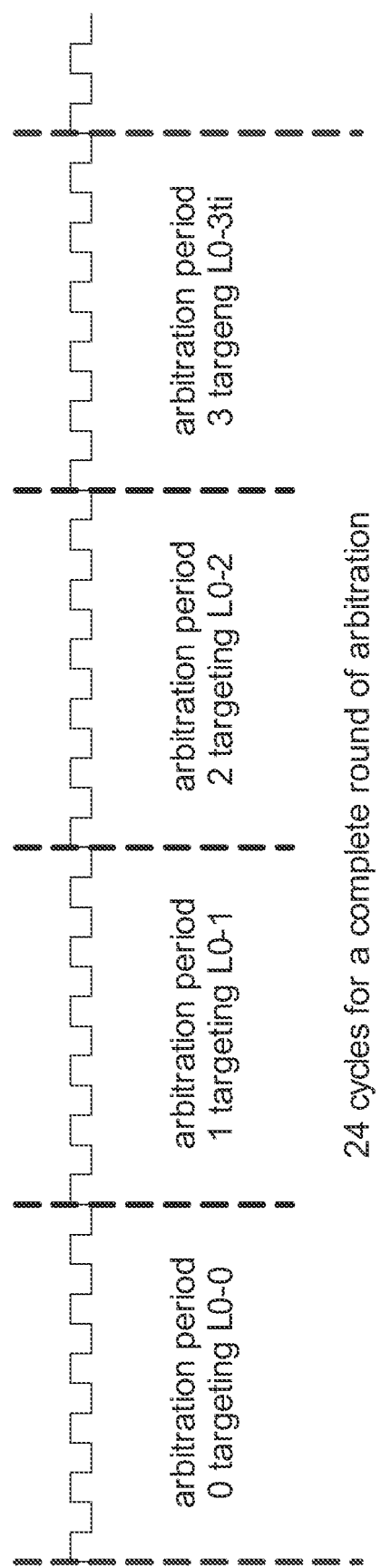
FIG. 11 is a functional diagram illustrating a system-wide arbitration round of 24 cycles for 3 levels of switching in an embodiment of the present invention.

This arbitration mechanism for these embodiments relies on matching of requests for a specific command target with the availability of that target to grant a request. At the bottom of the hierarchy there are many Functional Modules reporting requests and status, making a system-wide match within a single arbitration period unfeasible. A time division multiplexed mechanism is used in some of these embodiments to associate requests with specific targets for arbitration in a given arbitration period. For example, FIG. 11 illustrates a system-wide arbitration round of 24 cycles for 3 levels of switching in a certain embodiment. In some embodiments having more levels of switching, a complete system-wide arbitration round can have more arbitration periods, and the targets will be further categorized for each arbitration period.

Figure 12:
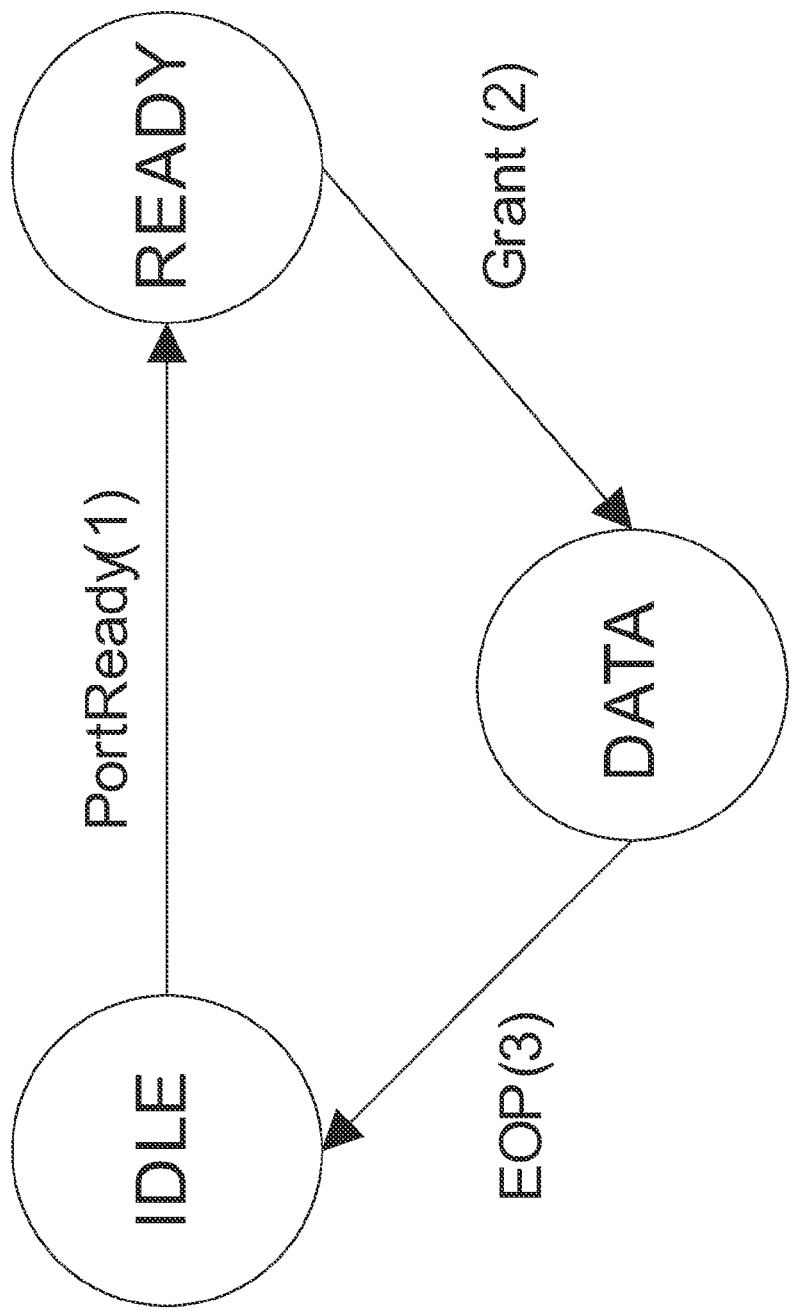
FIG. 12 is a functional diagram illustrating the state machine for a packet-switched network in an embodiment of the present invention.
Figure 13:
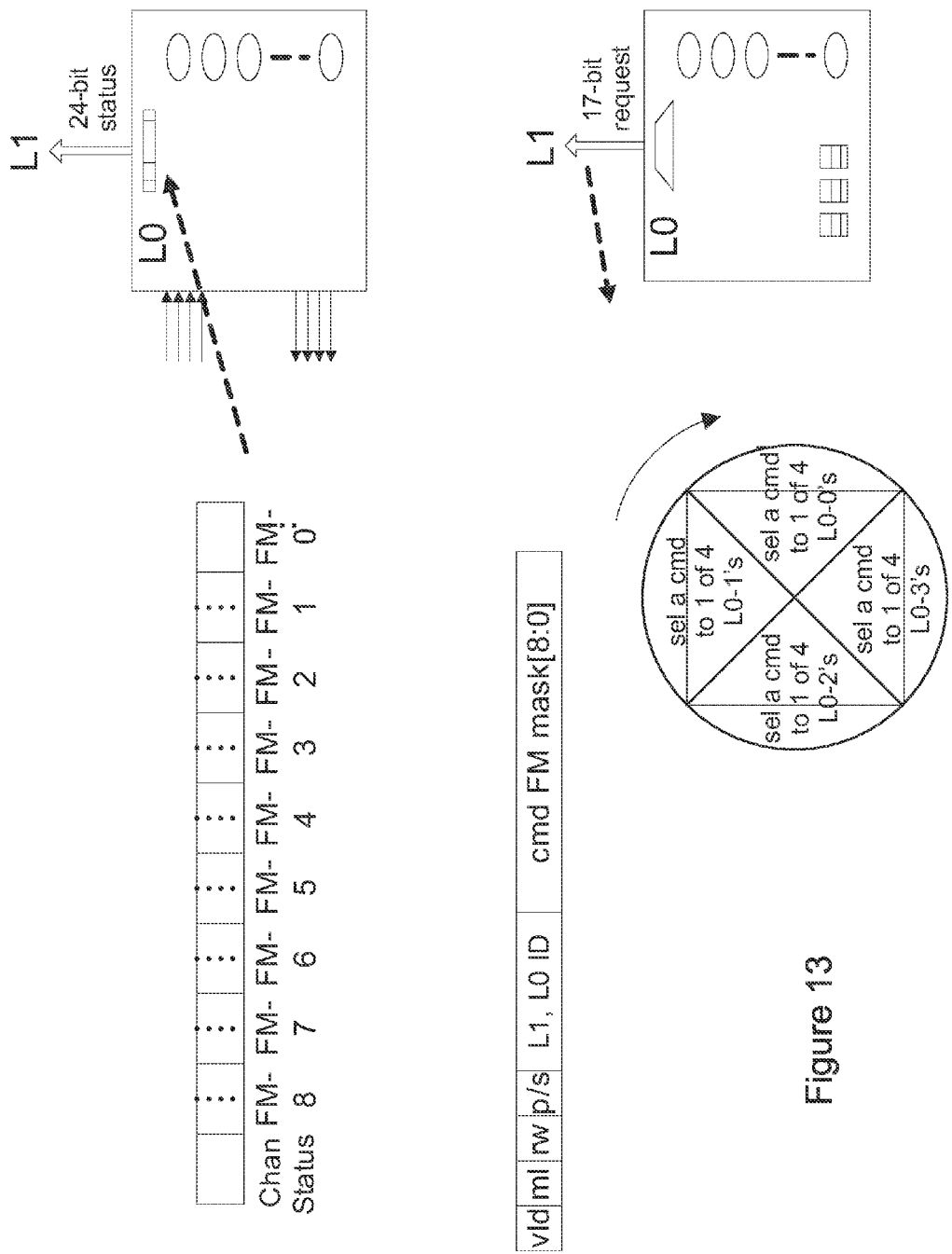
FIGS. 13-15C are functional diagrams that illustrate steps within each arbitration period in an embodiment of the present invention.
Figure 14:
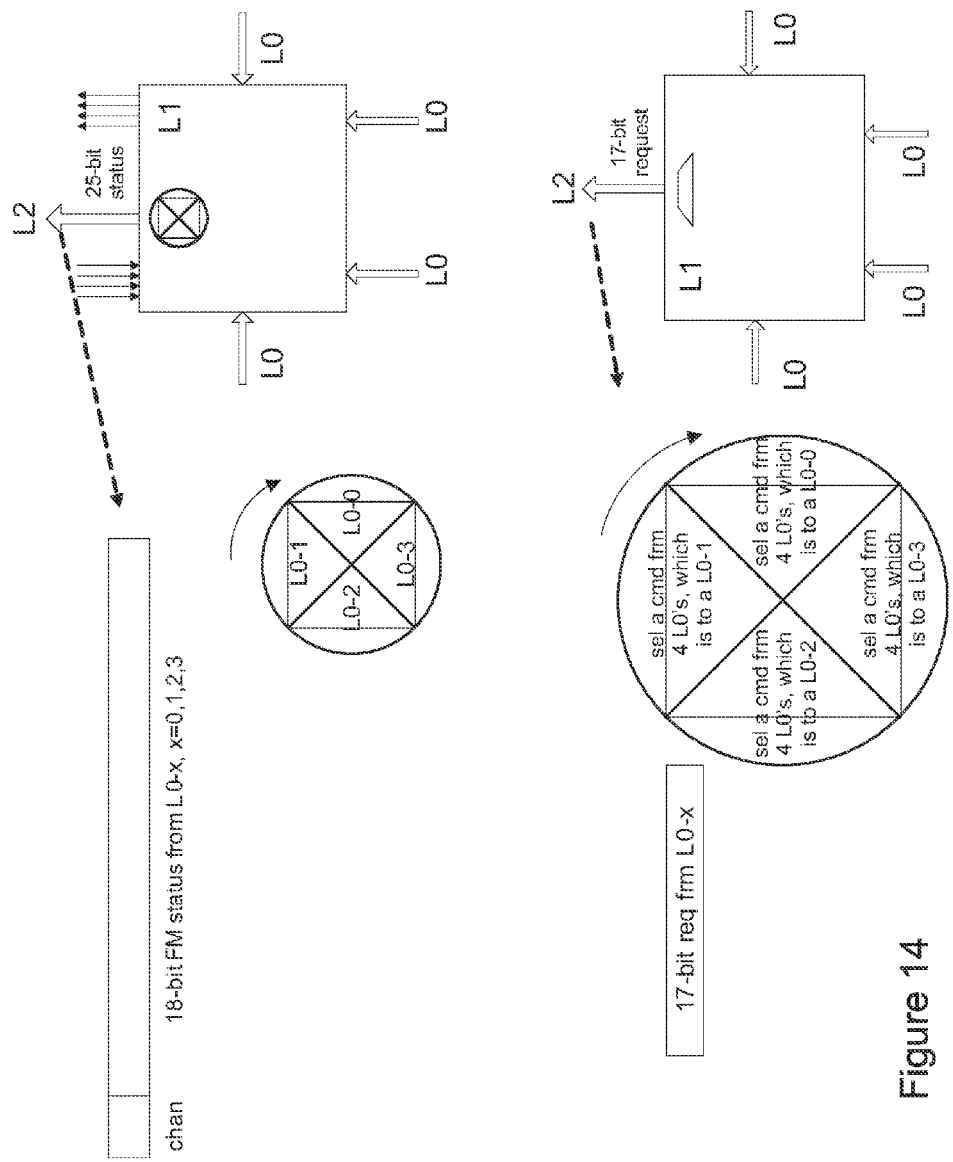
Figure 15A:
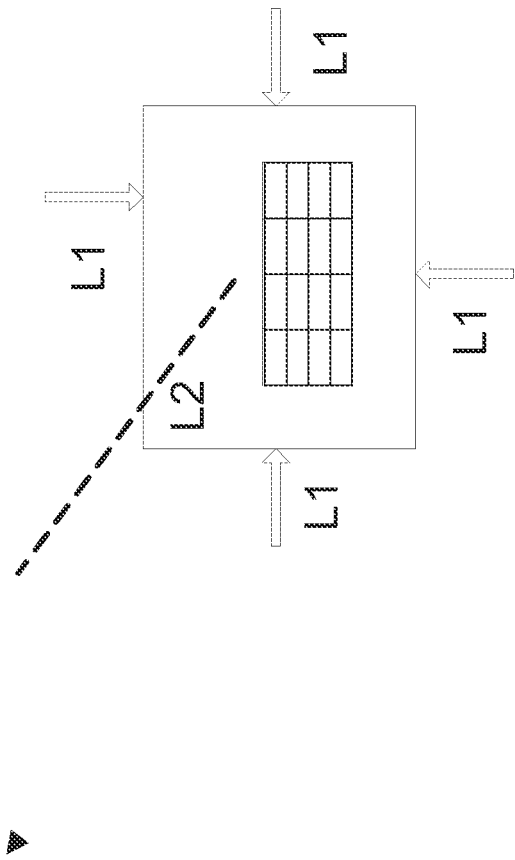
Figure 15B:
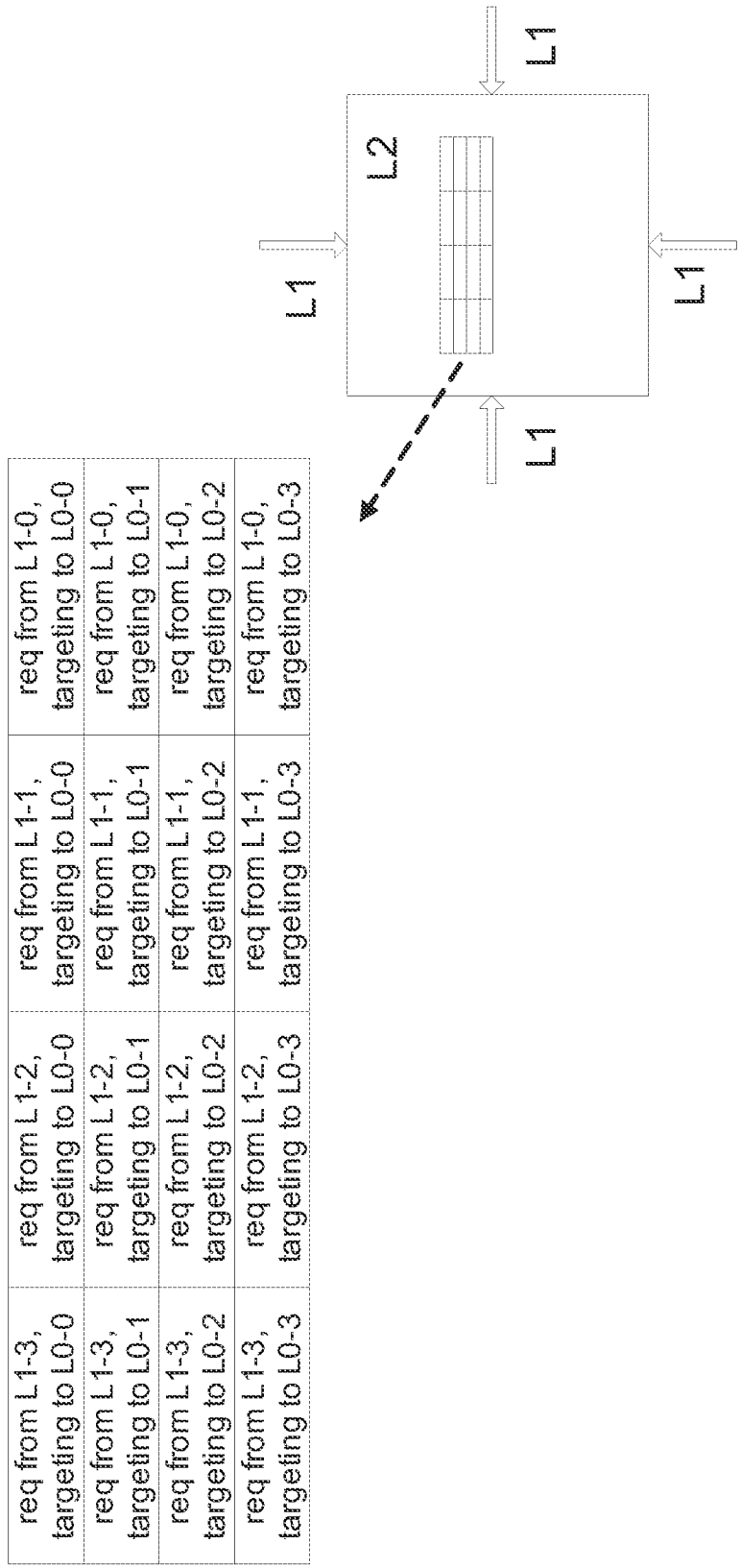
Figure 15C:
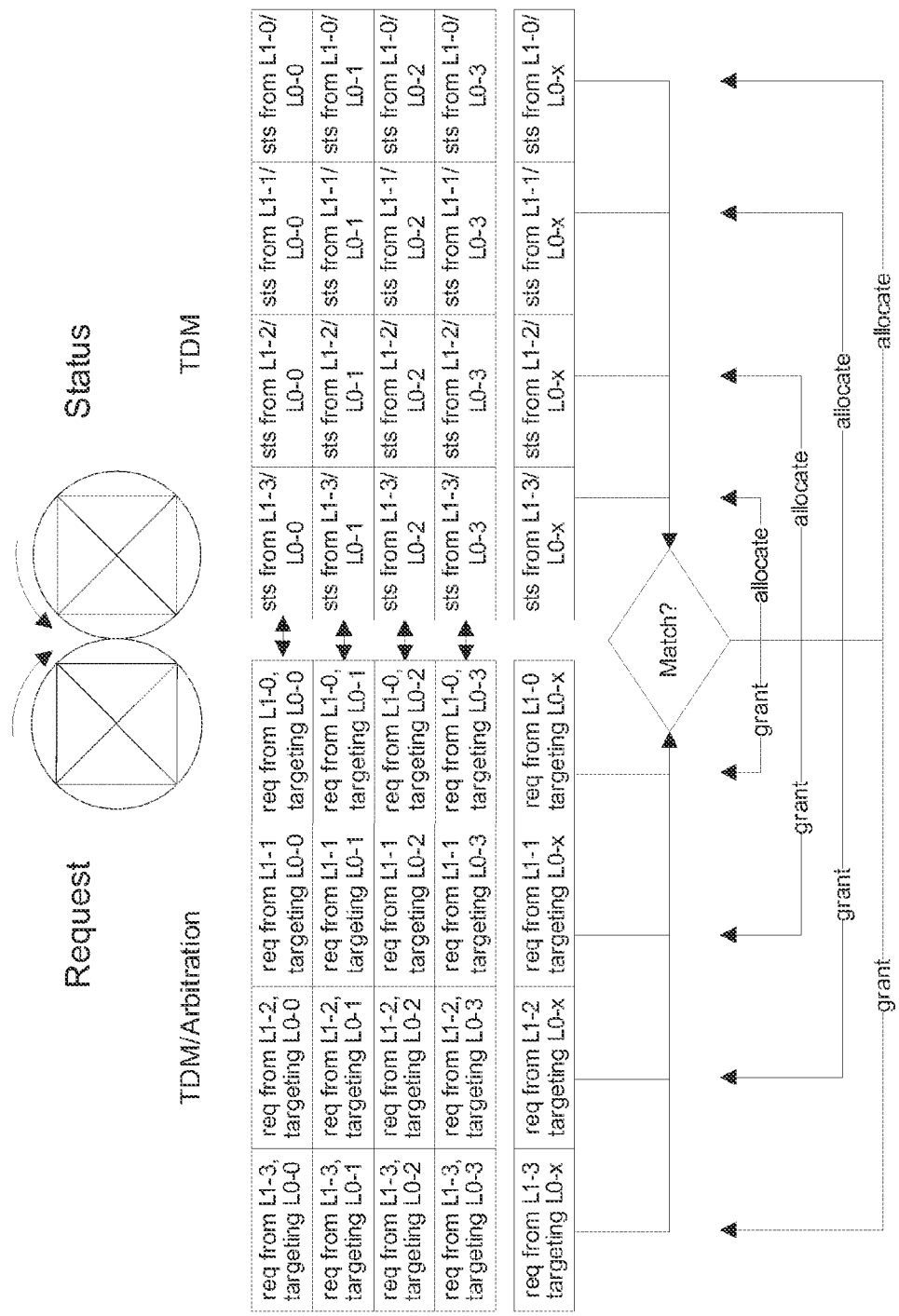

At the Functional Module level, in a packet-switched network according to various embodiments each node sends commands reporting status asynchronously to the arbitration cycle. Commands are queued up at each Switch Module as requests from specific Functional Modules. In some embodiments, there can be only one outstanding request per Functional Module. Statuses are reported for transmit ports (for Pull commands) and receive ports (for Push commands). A state of either idle (i.e. not available to transmit or receive) or ready can be reported for a port. The reporting of the status along with the status of a granted packet connection changes the state of a Functional Module for a packet connection. FIG. 12 illustrates the state machine for such an embodiment.

Each Switch Module performs the following steps within each arbitration period:
    Categorize each request based on
        Targets that match the arbitration schedule
        Commands that can be arbitrated locally (local) vs. commands that have to be arbitrated by a higher level Switch Module (remote)
        Priority of each request (high vs. low)
        Only remote commands matching the arbitration schedule can be reported to the parent Switch Module. High priority requests have to be exhausted before low priority requests are sent.
    Report requests to parent Switch Module
        A Switch Module will only report a request to a parent Switch Module if there is a resource at its level that is available to establish the requested packet connection.
        In embodiments, when commands have the exact same categorization for arbitration, L0 gives priority to them in a round-robin fashion over time
    Report status to the parent Switch Module based on the arbitration schedule
        At L0, statuses of all subsidiary Functional Modules are aggregated and reported.
        In embodiments, at higher levels, the selection of what status to report to higher level Switch Modules is determined in a round-robin format.
    After receiving the grant decision from the parent Switch Module (if one exists), the Switch Module updates the resource availability. Based on the reported status and resource availability, the Switch Module then grants one or more outstanding requests local to the level which are sent by subsidiary modules. Since reporting of the requests and statuses is based on the fixed arbitration schedule, the Switch Module can always find the status which matches a request.

FIGS. 13, 14, and 15A-C illustrate this process.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A system of network resources, the network resources being dynamically reconfigurable into a plurality of networks forming interconnections between nodes in a plurality of network nodes, each of the network nodes being one of a functional module and a peripheral module, each of the networks being configurable as one of a circuit-switched network and a packet-switched network, the system comprising:
    a plurality of switching modules, the switching modules being arranged in an ordered plurality of switching levels including a highest level and a lowest level, each of the switching modules including a selecting circuit controlled by a mode selecting signal, the selecting circuit according to the mode selecting signal being able to select a switching control signal from between a circuit-switching signal and a packet-switching signal, thereby selecting a mode of the switching module as one of a circuit-switched mode and a packet-switched mode; and
    a plurality of module interconnections, for each of the switching modules, the module interconnections providing forward and backward communication between the switching module and a plurality of modules at a next lower level, the plurality of modules at the next lower level including at least one of switching modules and network nodes, for each of the switching modules that is not at the highest level, the module interconnections providing forward and backward communication between the switching module and exactly one switching module at the next higher level, the switching modules and interconnections being thereby able to form a pair of forward and backward communication channels between any two of the network nodes.

2. The system of claim 1, wherein each switching module further includes a resource allocation storage circuit, the resource allocation storage circuit including at least one of registers and memory, the resource allocation storage circuit providing the mode selecting signal to the selection circuit.

3. The system of claim 1, wherein the module interconnections provide forward communication between each switching module four modules in a next lower level.

4. The system of claim 1, wherein the highest level of switching modules includes only one switching module.

5. The system of claim 1, wherein the switching modules and module interconnections are able to form communication channels between a data source network node and a data destination network node including:
a forward data transmission channel from the data source node to the data destination node;
a forward status transmission channel from the data source node to the data destination node; and
a backward status transmission channel from the data destination node to the data source node.

6. The system of claim 5, wherein the forward status transmission channel and the backward status transmission channel are used for exchanging flow control information regarding transmission of data on the data transmission channel between the data source node and the data destination node.

7. The system of claim 1, wherein the at least one of the switching circuits includes at least one crossbar switch.

8. The system of claim 1, further comprising a system control processor, interconnections within each switching module between input ports and output ports of the switching module being reconfigurable as frequently as every clock cycle of the control processor under control of a program being executed by the control processor.

9. A method for dynamically forming a network using a plurality of switching modules arranged in ordered switching layers, each of the switching modules being interconnected with modules on at least one of a next-higher switching layer and a next-lower switching layer, each of the switching modules being dynamically switchable between a circuit-switched operation mode and a packet-switched operation mode, the method comprising:
determining an operating mode of the network, the operating mode being one of circuit-switched and packet-switched;
selecting one of the switching modules as the root switching module for the network;
designating as target modules all of the modules that are either directly or indirectly subsidiary to the root switching module;
transmitting mode selection signals to all of the target switching modules, the mode selection signals causing the target switching modules to switch to the determined operating mode; and
initiating the target switching modules into operation as a network.

10. The method of claim 9, further comprising:
before transmitting the mode selection signals, determining if any of the target modules is part of an active network; and
for each target module that is part of an active network, sending stop signals to all switching modules included in the active network, thereby halting operation of the active network.

11. An arbitration method for controlling switching resources in a packet-switched network in response to connection requests by network nodes communicating through the network, the switching resources being arranged in an ordered plurality of switching levels having a highest level and a lowest level, whereby each switching module is interconnected with a plurality of modules at the next lower level, the plurality of modules at the next lower level including at least one of switching modules and network nodes, and each switching module that is not at the highest level is interconnected with exactly one switching module at the next higher level, the method comprising:
selecting the lowest switching level as the currently arbitrated level;
receiving of connection requests by the switching modules in the currently arbitrated level from modules in the next lower level, the connection requests being requests to connect source nodes with destination nodes, the connection requests including at least one of requests from network nodes in the next lower level and requests passed-through by switching modules in the next lower level from network nodes in levels below the next lower level;
granting requests for which the source node and the destination node are both direct or indirect subsidiaries of the same switching module in the currently arbitrated level by allocating switching resources of the switching module;
passing through to the next higher level requests and corresponding status information regarding connection requests for which the source node and the destination node are not both direct or indirect subsidiaries of the same switching module in the currently arbitrated level;
selecting the next higher switching level as the currently arbitrated level; and
repeating the steps of receiving, granting, passing through, and selecting the next higher switching level until resources have been allocated at all of the switching levels.

12. A system of network resources, the system comprising:
a plurality of network nodes;
a plurality of switching modules, the switching modules being arranged in an ordered plurality of switching levels having a highest level and a lowest level, each switching module being interconnected with a plurality of modules at the next lower level, the plurality of modules at the next lower level including at least one of switching modules and network nodes, and each switching module that is not at the highest level being interconnected with exactly one switching module at the next higher level;
a control processor; and
non-transient media containing software operable on the control processor so as to set switching configurations of the switching modules whereby input ports of each switching module are connected to output ports of the switching module, the switching configurations of the switching modules being settable every cycle of the control processor.

13. The system of claim 12, wherein switching levels can be added and removed from the ordered plurality of switching levels, thereby scaling the system to accommodate differing networking requirements.

* * * * *